US 8,490,126 B2

(12) United States Patent
Walter et al.

(10) Patent No.: US 8,490,126 B2
(45) Date of Patent: Jul. 16, 2013

(54) SYSTEM AND METHOD OF RESTRICTING ACCESS TO VIDEO CONTENT

(75) Inventors: Edward Walter, Boerne, TX (US); Steven Michael Wollmershauser, San Antonio, TX (US); Erin Tania Kenyon, Piedmont, CA (US)

(73) Assignee: AT&T Intellecutal Property I, LP, Atlanta, GA (US)

( * ) Notice: Subject to any disclaimer, the term of this patent is extended or adjusted under 35 U.S.C. 154(b) by 1227 days.

(21) Appl. No.: 11/541,922

(22) Filed: Oct. 2, 2006

(65) Prior Publication Data

US 2008/0092157 A1    Apr. 17, 2008

(51) Int. Cl.
*H04N 7/16*        (2011.01)
*H04N 7/167*      (2011.01)

(52) U.S. Cl.
USPC .................... 725/25; 725/27; 725/28; 725/31

(58) Field of Classification Search
None
See application file for complete search history.

(56) References Cited

U.S. PATENT DOCUMENTS

| | | | | |
|---|---|---|---|---|
| 5,036,537 A | * | 7/1991 | Jeffers et al. | 380/241 |
| 7,895,445 B1 | * | 2/2011 | Albanese et al. | 713/185 |
| 2003/0023980 A1 | * | 1/2003 | Kikinis et al. | 725/100 |
| 2005/0272405 A1 | | 12/2005 | Tomlinson et al. | |
| 2006/0128397 A1 | | 6/2006 | Choti et al. | |
| 2007/0027809 A1 | * | 2/2007 | Alve | 705/51 |
| 2007/0276925 A1 | * | 11/2007 | La Joie et al. | 709/219 |
| 2008/0022003 A1 | * | 1/2008 | Alve | 709/229 |
| 2008/0059409 A1 | * | 3/2008 | Montpetit | 707/2 |
| 2008/0097919 A1 | * | 4/2008 | Szucs | 705/52 |

* cited by examiner

*Primary Examiner* — Chris Parry
*Assistant Examiner* — Omar S Parra
(74) *Attorney, Agent, or Firm* — Toler Law Group, PC

(57) ABSTRACT

Disclosed are a system and method of restricting access to video content. In a particular embodiment, the method includes sending a request for video content to a set-top box device from a remote user device via a video distribution network. The method also includes receiving location data at the remote user device via the video distribution network, the location data indicating a location of the remote user device. The method also includes indicating at the remote user device that the video content is inaccessible, when access to the video content is restricted within a region that includes the location.

27 Claims, 6 Drawing Sheets

SYSTEM AND METHOD OF RESTRICTING ACCESS TO VIDEO CONTENT

FIELD OF THE DISCLOSURE

The present disclosure relates generally to restricting access to video content.

BACKGROUND

Television viewing is part of daily life for many people. For various reasons, access to some television programs can be restricted. Nonetheless, viewers may be able to circumvent regional restrictions, for example, by accessing video content via remote devices. Hence, there is a need for an improved system and method of restricting access to video content.

DETAILED DESCRIPTION OF THE DRAWINGS

A set-top box device is disclosed and includes a processor and a memory device accessible to the processor. In a particular embodiment, the memory device can include instructions executable by the processor to communicate with a remote user device to receive a request for video content via a private access network of an Internet Protocol Television (IPTV) system. Further, the memory device can include instructions to determine whether a blackout enforcement application is installed at the remote user device. In addition, the set-top box device includes a re-director to re-direct the requested video content to the remote user device via the private access network when the blackout enforcement application is installed at the remote user device. The blackout enforcement application indicates at the remote user device that the video content is inaccessible when at least one data packet of the video content indicates that access to the video content is restricted within a market zone that includes a location of the remote user device.

In a particular embodiment, a method of restricting access to video content is disclosed and includes sending a request for video content to a set-top box device from a remote user device via a video distribution network. The method also includes receiving location data at the remote user device via the video distribution network, the location data indicating a location of the remote user device. The method also includes indicating at the remote user device that the video content is inaccessible, when access to the video content is restricted within a region that includes the location.

In another particular embodiment, a method of restricting access to video content is disclosed and includes receiving a request for video content at a set-top box device from a remote user device via a private access network of an Internet Protocol Television (IPTV) system. The method also includes receiving location data at the set-top box device via the private access network, the location data indicating a location of the remote user device. The method also includes not re-directing the video content to the remote user device via the private access network when access to the video content is restricted at the location.

In another particular embodiment, a computer-readable medium is disclosed and includes a group of instructions executable by a processor to receive video content via a private access network of an Internet Protocol Television (IPTV) system. The computer-readable medium also includes instructions to communicate with the IPTV system to receive location data at the remote user device via the private access network, the location data indicating a location of the remote user device. The computer-readable medium also includes instructions to indicate at the remote user device that the video content is inaccessible, when access to the video content is restricted at the location.

Figure 1:
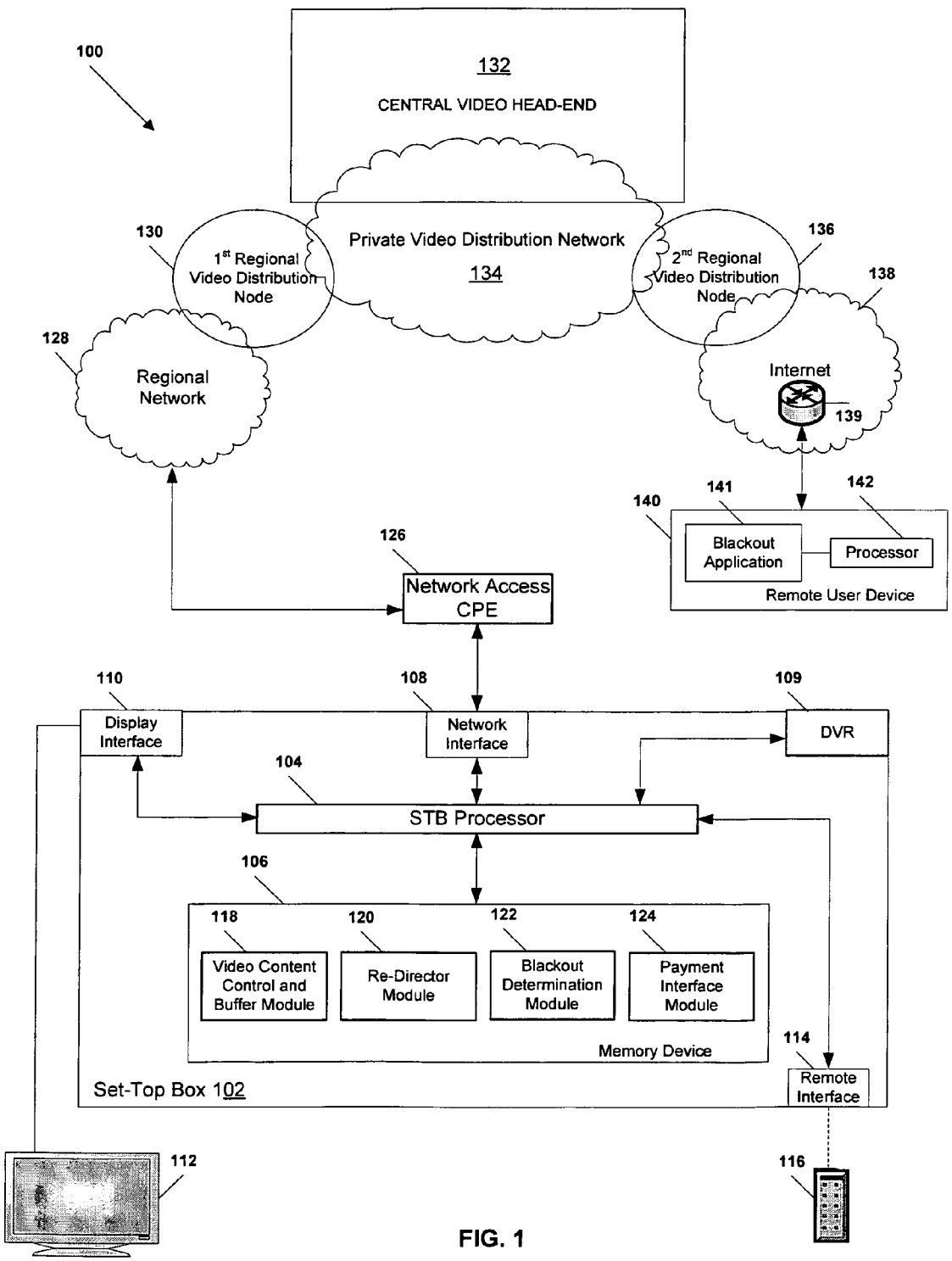
FIG. 1 is a block diagram of a particular illustrative embodiment of a system to restrict access to video content.

Referring to FIG. 1, a particular illustrative embodiment of a system to restrict access to video content is illustrated and designated generally at 100. The system 100 includes a set-top box device 102 that communicates with a central video head-end office 132, via a private video distribution network 134, such as a cable network or an Internet Protocol Television (IPTV) network. In an illustrative, non-limiting embodiment, the set-top box device 102 can be coupled to a customer premises equipment (CPE) device 126 that communicates with a first regional video distribution node 130 via a regional network 128, such as a network that serves a neighborhood, metropolitan area, state, nation, other geographic region, or any combination thereof.

As illustrated in FIG. 1, the central video head-end office 132 can communicate with the first regional video distribution node 130 and with a second regional video distribution node 136 via the private video distribution network 134. In a particular embodiment, a remote user device 140 can communicate with the private video distribution network 134 via the second regional video distribution node 136. In an illustrative embodiment, the remote user device 140 can communicate with the second regional video distribution node 136 over the Internet 138 via a network edge device 139.

The remote user device 140 can include a desktop computer, a laptop or other portable computer, a personal data assistant (PDA), a cellular phone or other portable phone, any other device adapted to request and receive video content, or any combination thereof.

In a particular embodiment, the set-top box device 102 can include a processor 104 and a memory device 106 accessible to the processor 104. Further, the set-top box device 102 can communicate with the network access CPE 126 via a network interface 108 coupled to the processor 104. In addition, the set-top box device 102 can communicate with a display device 112 via a display interface 110 coupled to the processor 104. Moreover, the set-top box device 102 can communicate with a remote control device 116 via a remote interface 114 coupled to the processor 104. In a particular embodiment, the set-top box device 102 can include a digital video recorder (DVR) 109 coupled to the processor 104.

In a particular embodiment, the memory device 106 can include a video content control and buffer module 118 that is executable by the processor 104 to request video content from the central video head-end 132. In addition, the video content control and buffer module 118 can be executable by the processor 104 to receive video content from the central video head-end 132. In an illustrative embodiment, the video content control and buffer module 118 can be executable by the processor 104 to receive data packets carrying the video content and to buffer the data packets to prevent underflow to the display device 112.

In a particular embodiment, the memory device 106 can include a re-director module 120 that is executable by the processor 104 to communicate with the remote user device 140 via the private video distribution network 134. For example, the re-director module 120 can be executable by the processor 104 to communicate with the remote user device 140 to receive a request from the remote user device 140 for video content, to determine whether a blackout enforcement application 141 or similar application is installed at the remote user device 140, to re-direct video content to the remote user device 140, to make other communications with the remote user device 140, or any combination thereof. In an illustrative embodiment, the re-director module 120 can be executable by the processor 104 to re-direct video content by sending video content received at the set-top box device 102 to the remote user device 140 via the private video distribution network 134 or by instructing a video server or other server at the central video head-end 132 to send video content to the remote user device 140.

In a particular embodiment, the memory device 106 can include a blackout determination module 122 that is executable by the processor 104 to determine whether video content is restricted. In an illustrative embodiment, where video content received by the set-top box device 102 is carried by marked data packets, the blackout determination module 122 can be executable by the processor 104 to determine whether data, a header, or any combination thereof, within one or more leading data packets or other data packets of the video content indicate that the video content is subject to a blackout or other restriction. In addition, the blackout determination module 122 can be executable by the processor 104 to determine, based on such data packets, at least one location, such as a neighborhood, metropolitan area, state, nation, other geographical region or market zone, or any combination thereof, within which the video content is subject to the blackout or other restriction.

In a particular illustrative embodiment, the blackout determination module 122 can be executable by the processor 104 to instruct the DVR 109 to record requested video content, when the requested video content is subject to a blackout or other restriction at a location, or within a region that includes the location, of the remote user device 140, but not at a location, or within a region that includes the location, of the set-top box device 102. For example, if the requested video content is a Dallas Cowboys game that is blacked out in Dallas, where the remote user device 140 is located, but not blacked out in Los Angeles, where the set-top box device 102 is located, the set-top box device 102 may automatically record the requested video content via the DVR 109.

In a particular embodiment, the re-director module 120, the blackout determination module 122, or any combination thereof, can be executable by the processor 104 to receive location data from the central video head-end 132 indicating a location of the remote user device 140. Moreover, the re-director module 120, the blackout determination module 122, or any combination thereof, can be executable by the processor 104 to not re-direct video content to the remote user device 140 when the video content is subject to a blackout or other restriction at a location, or within a region that includes the location, of the remote user device 140. For example, the re-director module 120, the blackout determination module 122, or any combination thereof, can be executable by the processor 104 to not send video content received at the set-top box device 102 to the remote user device 140. In another embodiment, the re-director module 120, the blackout determination module 122, or any combination thereof, can be executable by the processor 104 to instruct a video server or other server of the central video head-end 132 to not send the video content to the remote user device 140.

In a particular, illustrative embodiment, the memory device 106 can include a payment interface module 124 that is executable by the processor 104 to send a payment interface to the remote user device 140 when video content is subject to a blackout or other restriction that can be lifted, reversed, or negated, in return for a payment. For example, the re-director module 120, the blackout determination module 122, the payment interface module 124, or any combination thereof, can be executable by the processor 104 to determine whether data, a header, or any combination thereof, within one or more leading data packets or other data packets of the video content indicate that a blackout or other restriction that can be lifted, reversed, or negated, in return for a payment. The payment interface module 124 can send a payment interface to the remote user device 140 via the private video distribution network 134 and can receive payment information from the remote user device 140 via the interface. In another embodiment, the payment interface module 124 can be executable by the processor 104 to instruct the remote user device 140, or an application operated thereon, to display a payment interface at the remote user device 140.

In an illustrative embodiment, the re-director module 120, the blackout determination module 122, the payment interface module 124, or any combination thereof can be executable by the processor 104 to instruct a billing server, data server, other server, or any combination thereof, at the central video head-end 132 to send the restricted video content to the remote user device 140 after payment information is received at the set-top box device 102, at a billing server at the central video head-end 132 or a regional video distribution node, or any combination thereof. In another illustrative embodiment, the set-top box device 102 can send the restricted video content to the remote user device 140 after payment information is received at the set-top box device 102, at a billing server at the central video head-end 132 or a regional video distribution node, or any combination thereof.

In an illustrative embodiment, one or more of the various modules 118-124 can include hardware logic, software logic, or any combination thereof, adapted to provide various functions of the set-top box device 102. For example, one or more of the modules 118-124 can include computer instructions that are executable by the processor 104, where the instructions are stored as one or more computer programs by the memory device 106.

In a particular embodiment, the remote user device 140 can include a blackout enforcement application 141 that is executable by a processor 142 to receive requested video content from the set-top box device 102 or from the central video head-end 132, via the private video distribution network 134. Further, the blackout enforcement application 141 can be executable by the processor 142 to determine whether the video content is subject to a blackout or other restriction, for example, based on at least one marked data packet of the video content.

In a particular embodiment, the blackout enforcement application 141 can be executable by the processor 142 to receive location data from the central video head-end 132 indicating a location of the remote user device 140, such as a market zone. The blackout enforcement application 141 can be executable by the processor 142 to determine whether the video content is subject to a blackout or other restriction at the location, or within a region that includes the location, of the remote user device 140. The blackout enforcement application 141 can be executable by the processor 142 to cause the remote user device 140 to not display the video content when the video content is subject to a blackout or other restriction at the location, or within a region that includes the location, of the remote user device 140.

In an illustrative, non-limiting embodiment, the blackout enforcement application 141 can be executable by the processor 142 to determine whether a blackout or other restriction can be lifted, reversed, or negated in return for a payment and to cause the remote user device 140 to display a payment interface. The blackout enforcement application 141 can be executable by the processor 142 to receive payment information via the payment interface and to send the payment information to the set-top box device 102, the central video head-end 132, a regional video distribution node, or any combination thereof. The blackout enforcement application 141 can be executable by the processor 142 to cause the remote user device 140 to display the restricted video content after payment information is received at the remote user device 140, set-top box device 102, the central video head-end 132, a regional video distribution node, or any combination thereof.

Figure 2:
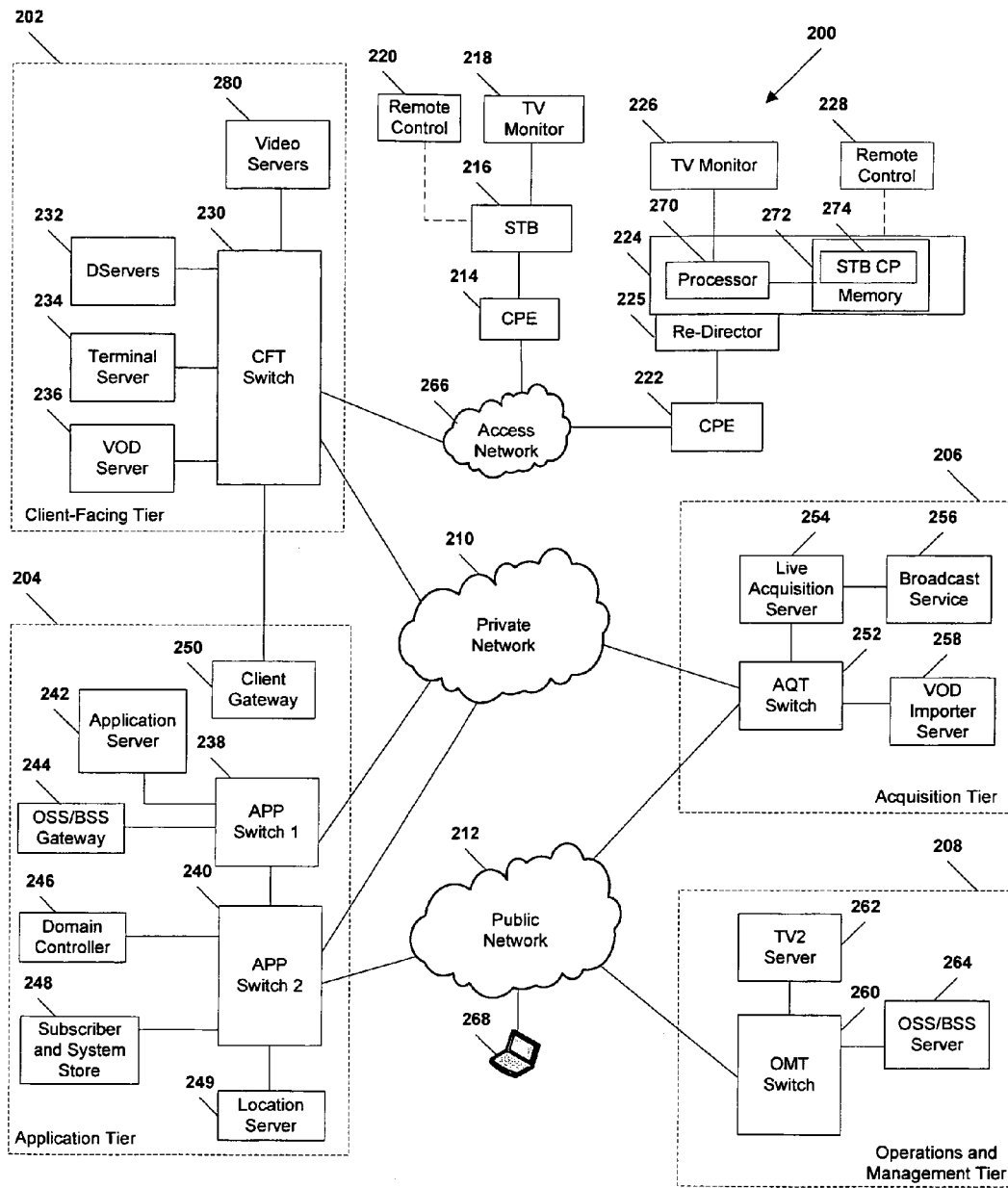
FIG. 2 is a block diagram of a second particular illustrative embodiment of a system to restrict access to video content.

Referring to FIG. 2, an illustrative embodiment of an Internet Protocol Television (IPTV) system that may be used to restrict access to video content is illustrated and is generally designated 200. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

The client-facing tier 202 can communicate with user equipment via an access network 266, such as an Internet Protocol Television (IPTV) access network. In an illustrative embodiment, customer premises equipment (CPE) 214, 222 can be coupled to a local switch, router, or other device of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premises, and the second representative set-top box device 224 and the second CPE 222 can be located at a second customer premises. In another particular embodiment, the first representative set-top box device 216 and the second representative set-top box device 224 can be located at a single customer premises, both coupled to one of the CPE 214, 222.

The CPE 214, 222 can include routers, local area network devices, modems, such as digital subscriber line (DSL) modems, residential gateway devices, any other suitable devices for facilitating communication between a set-top box device and the access network 266, or any combination thereof. In an exemplary embodiment, the client-facing tier 202 can be coupled to the CPE 214, 222 via fiber optic cables. In another exemplary embodiment, the CPE 214, 222 can be digital subscriber line (DSL) modems that are coupled to one or more network nodes via twisted pairs, and the client-facing tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control 220, and the second set-top box device 224 can communicate with a second remote control 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, the set-top box devices 216, 224 can include a STB processor 270 and a STB memory device 272 that is accessible to the STB processor 270. In one embodiment, a computer program, such as the STB computer program 274, can be embedded within the STB memory device 272.

In a particular embodiment, each of the set-top box devices, such as the second representative set-top box device 224, can include a re-director portion 225 adapted to communicate with a remote user device, such as the user computing device 268, via the access network 266. In an illustrative embodiment, the re-director portion 225 can include hardware coupled to the second representative set-top box device 224; hardware integrated with the second representative set-top box device 224; software instructions stored at the second representative set-top box device 224; or any combination thereof.

In an illustrative, non-limiting embodiment, the user computing device 268 can communicate with the IPTV system 200 via the public network 212. The re-director portion 225 can receive a request from the user computing device 268 for video content; determine whether a blackout enforcement application or similar application is installed at the user computing device 268; re-direct video content to the user computing device 268; or any combination thereof. The re-director portion 225 can re-direct video content by sending video content received at the set-top box device 224 to the user computing device 268 via the access network 266 or by instructing a video server 280 or other server of the IPTV system 200 to send video content to the user computing device 268.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a connection point to the private network 210. In a particular embodiment, the CFT switch 230 can be coupled to a video-on-demand (VOD) server 236 that stores or provides VOD content imported by the IPTV system 200. Further, the CFT switch 230 is coupled to one or more video servers 280 that receive video content and send the video content to the set-top boxes 216, 224 via the access network 266. In a particular embodiment, the video servers 280 can send video content to the user computing device 268 via the public network 212.

In an illustrative embodiment, the client-facing tier 202 can communicate with a large number of set-top boxes via the access network 266, such as the representative set-top boxes 216, 224, over a wide geographic area, such as a neighborhood area, a metropolitan area, a viewing area, a statewide area, a regional area, a nationwide area or any other suitable geographic area, market area, or subscriber or customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming, display, messaging, processing of VOD material and other IPTV content, etc. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers via the public network 212. For example, the domain controller 246 can provide remote Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224. Further, the second APP switch 240 can communicate with a user computing device 268 via the public network 212. Moreover, the second APP switch 240 can be coupled to a location server 249 that is adapted to determine a location of a remote user device, such as the user computing device 268.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224, or other devices coupled to the CPE 214, 222, can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber and/or billing information, the client gateway 250 can allow the set-top box device 216 to access IPTV content and VOD content at the client-facing tier 202. If the client gateway 250 cannot verify subscriber information for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television content, movie content, advertisement content, other video content, or any combination thereof, from a broadcast service 256, such as a satellite acquisition system or satellite head-end office. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video or audio portions of the content can be streamed to the set-top box devices 216, 224.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230. Upon receiving such requests, the VOD server 236 can retrieve the requested VOD content and transmit the content to the set-top box devices 216, 224 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 286 that monitors network devices within or coupled to the IPTV system 200. In a particular embodiment, the OMT switch 260 can communicate with the AQT switch 252 via the public network 212.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 coupled to the public network 212.

In a particular illustrative embodiment, the location server 249 can assign codes to various locations, such as market zone codes. Certain market zone codes can be sent to the D-servers 232, video servers 280, other servers, or any combination thereof, to mark data packets of video content that is subject to a blackout or other restriction with data indicating market zones or other locations or regions within which the video content is restricted.

In a particular embodiment, the user computing device 268 can send a request to the second representative set-top box device 224, for example, to receive certain video content. In an illustrative embodiment, the request can be communicated over the public network 212 to the IPTV system 200 and from the IPTV system 200 to the second representative set-top box device 224 via the access network 266. In an illustrative embodiment, the second representative set-top box device 224 can communicate with the user computing device 268 via the access network 266 to determine whether a blackout enforcement application or similar application is installed at the user computing device 268. If such an application is not installed at the user computing device 268, the second representative set-top box device 224 can send an instruction to the application server 242, for example, to install the application at the user computing device 268. If the application is refused at the user computing device 268, the second representative set-top box device 224 can terminate communication with the user computing device 268, or the second representative set-top box device 224 or application server 242 can send data to the user computing device 268 indicating that the application must be installed at the user computing device 268 before video content can be re-directed to the user computing device 268.

The second representative set-top box device 224 can request the video content from the video servers 280 or other server(s) of the IPTV system 200. In a particular embodiment, the second representative set-top box device 224 can receive one or more marked data packets related to the video content that include data, header information, or any combination thereof, indicating whether the video content is subject to a blackout or other restriction; one or more market zones within which the video content is subject to a blackout or other restriction; or any combination thereof. The marked data packet(s) can carry the video content. Alternatively, the marked data packet(s) can be leading data packets that carry data related to the video content and are sent in advance of data packets carrying the video content.

In an illustrative embodiment, the second representative set-top box device 224 can re-direct the marked data packet(s) to the user computing device 268 via the re-director portion 225. The blackout enforcement application or other application stored at the user computing device 268 can be adapted to determine whether the requested video content is subject to a blackout or other restriction based on blackout data included in the marked data packet(s). In addition, the application can be adapted to determine one or more market zones or other locations or regions within which the requested video content is restricted. If the video content is subject to a blackout or other restriction, the application can be adapted to communicate with the location server 249 to receive location data indicating a market zone or other location of the user computing device 268 and to cause the user computing device 268 to not display the video content when the video content is subject to a blackout or other restriction at the location, or within a region that includes the location, of the user computing device 268.

In an illustrative, non-limiting embodiment, the location server 249 can determine a location of the user computing device 268 by determining a location of a network edge device from which communications sent by the user computing device 268 are received. For example, the location server 249 can identify a location associated with a network edge device, such as the edge device 139 illustrated in FIG. 1. In another embodiment, the location server 249 or other device of the IPTV system 200 can store IP addresses in association with various locations and determine a location of the user computing device 268 based at least partially on the IP address from which communications are sent by the user computing device 268.

In a particular embodiment, the blackout enforcement or other application stored at the user computing device 268 can be adapted to determine whether a blackout or other restriction can be lifted, reversed, or negated in return for a payment and to cause the user computing device 268 to display a payment interface. The application can be adapted to receive payment information via the payment interface and to send the payment information to the second representative set-top box device 224, the OSS/BSS server 264 or other billing server of the IPTV system 200, or any combination thereof. Further, the application can be adapted to cause the user computing device 268 to display the restricted video content after payment information is received at the user computing device 268, second representative set-top box device 224, the OSS/BSS server 264 or other billing server of the IPTV system 200, or any combination thereof.

In another illustrative embodiment, the second representative set-top box device 224, re-director 225, or any combination thereof, can determine whether the requested video content is subject to a blackout or other restriction based on the marked data packets. In addition, the second representative set-top box device 224, re-director 225, or any combination thereof, can determine one or more market zones or other locations within which the video content is subject to the restriction. Further, the second representative set-top box device 224, re-director 225, or any combination thereof, can receive location data from the location server 249, or other server of the IPTV system 200, that indicates a location of the user computing device 268.

The second representative set-top box device 224, re-director 225, or any combination thereof, can determine based at least partially on the marked data packets, the location data, or any combination thereof, whether the video content is subject to a restriction at a location, or within a region that includes the location, of the user computing device 268. If the video content is not subject to a restriction at the location, or within a region that includes the location, of the user computing device 268, the second representative set-top box device 224, re-director 225, or any combination thereof, can re-direct the requested video content to the user computing device 268 by sending the video content to the user computing device 268 or instructing a video server 280 or other server of the IPTV system 200 to send the video content to the user computing device 268. If the video content is subject to a restriction at the location, or within a region that includes the location, of the user computing device 268, the second representative set-top box device 224, re-director 225, or any combination thereof, can not re-direct the requested video content to the user computing device 268. In an exemplary embodiment, the second representative set-top box device 224, re-director 225, or any combination thereof, can send data to the user computing device 268 indicating that the video content cannot be accessed or is unavailable.

Figure 3:
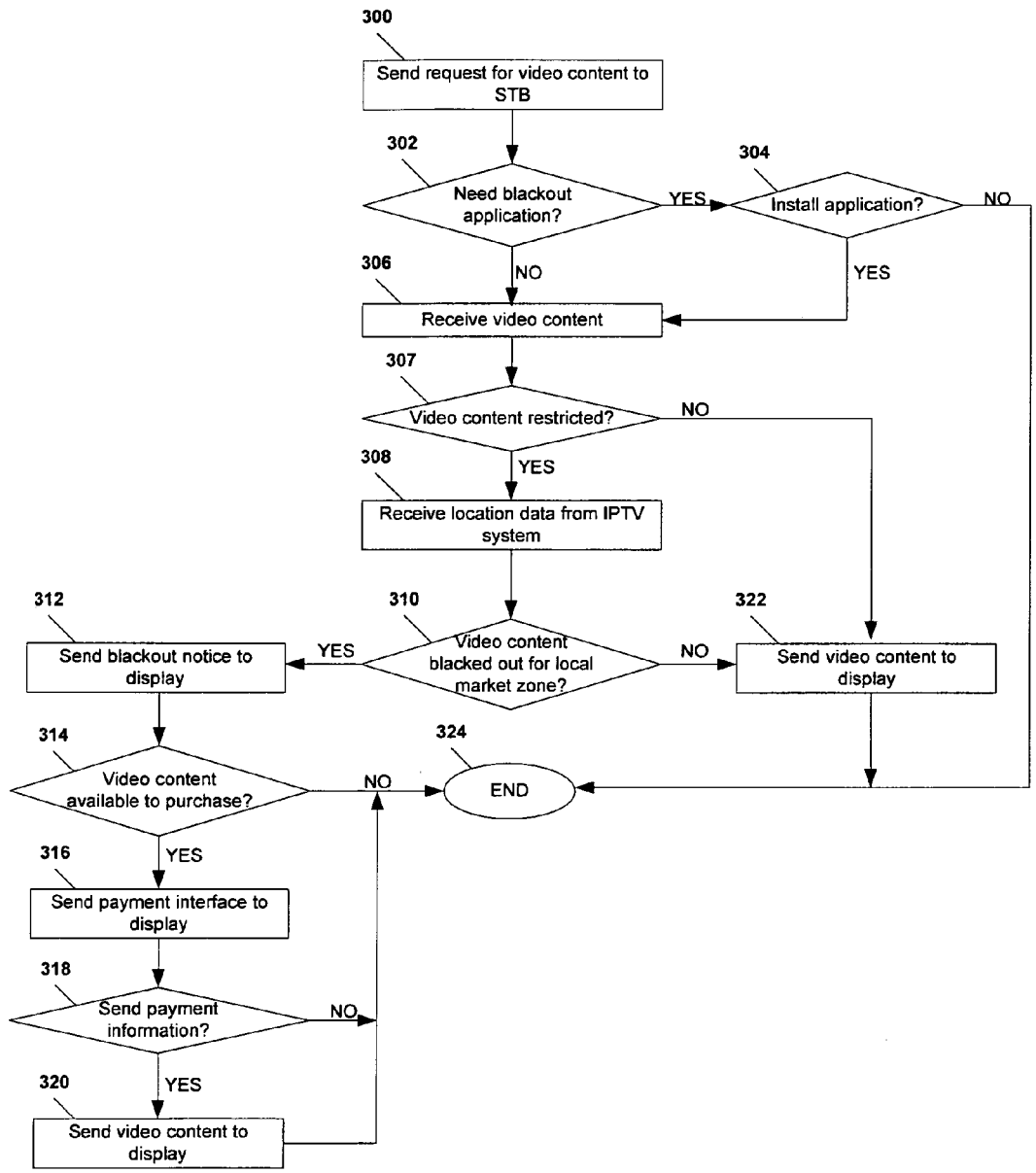
FIG. 3 is a flow diagram of a particular illustrative embodiment of a method of restricting access to video content.

Referring to FIG. 3, a particular illustrative embodiment of a method of restricting access to video content is illustrated. At block 300, a user computing device sends a request for video content to a set-top box device via a video distribution network. For example, a user can use a portable computing device to communicate with a private access network of an Internet Protocol Television (IPTV) system via the Internet at a location that is remote from the set-top box device. In a particular embodiment, the user computing device can control the set-top box device via a re-director device or application at the set-top box device.

Moving to decision node 302, in an illustrative embodiment, the user computing device can determine whether a blackout enforcement application or other similar application is installed at the user computing device. If the user computing device determines that such an application is installed at the user computing device, the method can advance to block 306. Conversely, if the user computing device determines that such an application is not installed at the user computing device, the method can proceed to decision node 304, and the user computing device can determine whether it will install the application. For example, if the application is not installed at the user computing device, the user computing device can receive an offer or prompt to install the application from the set-top box device or an application server of the IPTV system. A user can select to install or not install the application. If the user computing device does not install the application, the method terminates 324. On the other hand, if the user computing device installs the application, the method continues to block 306.

At block 306, in a particular embodiment, the user computing device can receive the requested video content. The video content can be received from the set-top box device or from a server of the IPTV system or other video head-end. In an illustrative embodiment, a secure connection can be established between the user computing device and the IPTV or other video head-end for transfer of video content. Moving to decision node 307, the user computing device can determine whether the video content is subject to a blackout or other restriction. In an illustrative embodiment, the video content can include data indicating whether the video content is subject to a blackout or other restriction. If the user computing device determines that the video content is not subject to a blackout or other restriction, the method proceeds to block 322, and the video content is sent to a display integrated with, or coupled to, the user computing device.

On the other hand, if user computing device determines that the video content is subject to a blackout or other restriction, the method advances to block 308, and the user computing device receives location data from the IPTV system or other video head-end indicating a location of the user computing device. Continuing to decision node 310, the user computing device determines based on the data received with the video content whether the video content is restricted at a location, or within a region that includes the location, of the user computing device. If the video content is not restricted at a location, or within a region that includes the location, of the user computing device, the method proceeds to block 322, and the user computing device sends the video content to the display. Whereas, in an illustrative embodiment, if the video content is restricted at the location, or within a region that includes the location, of the user computing device, the method can move to block 312, and the user computing device can send a blackout notice or other restriction notice to the display.

In a particular embodiment, the method can continue to decision node 314, and the user computing device can determine whether the video content is available to purchase, for example, based on data received with the video content. If the video content is not available to purchase, the method terminates at 324. Conversely, if the video content is available to purchase, the method can proceed to block 316, and the user computing device can send a payment interface to the display. Advancing to decision node 318, the user computing device can determine whether payment information is received via the payment interface. If payment information is not received, the method terminates at 324. On the other hand, if payment information is received, the method moves to block 320, and the video content can be sent to the display. The method then terminates at 324.

Figure 4:
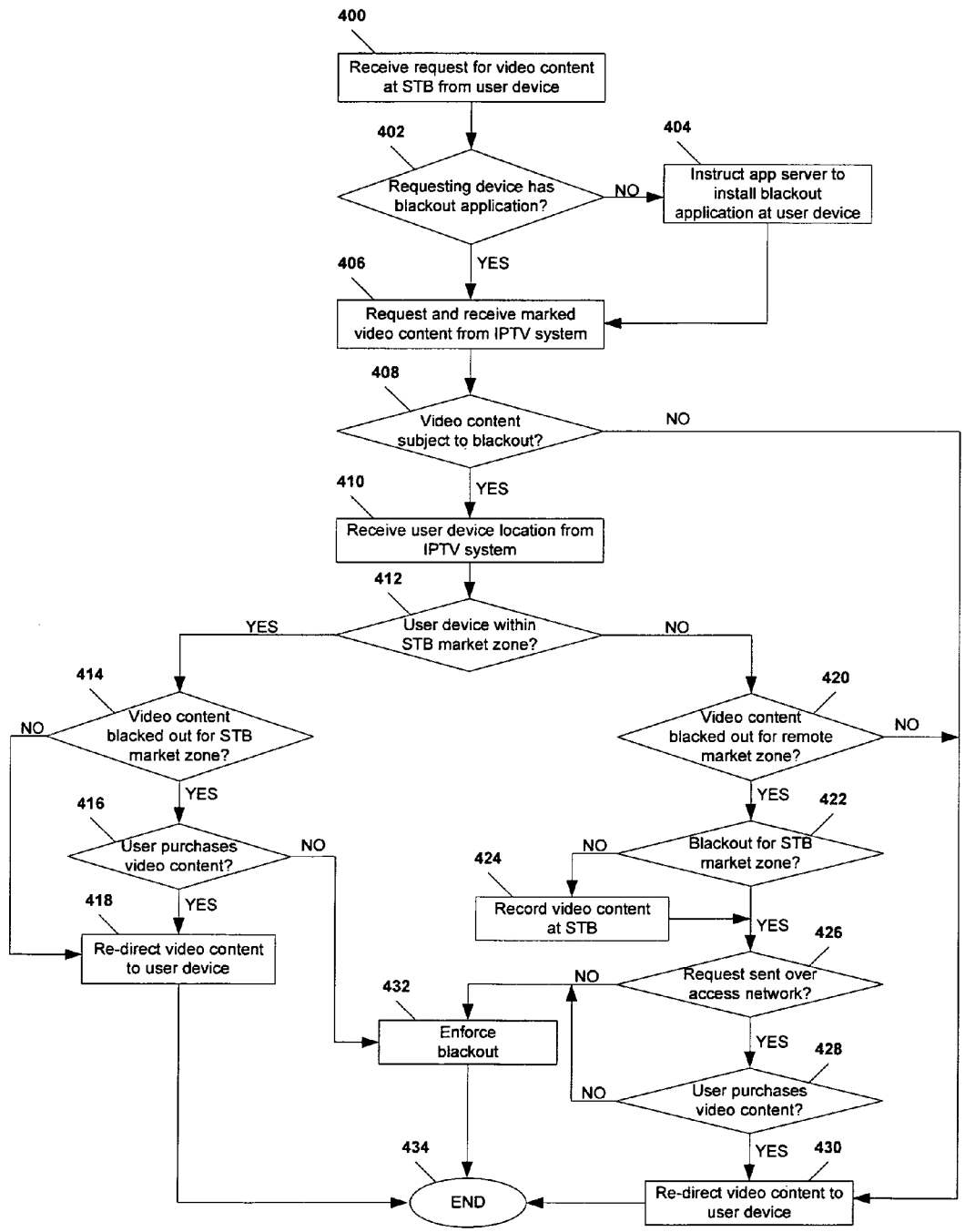
FIG. 4 is a flow diagram of a second particular illustrative embodiment of a method of restricting access to video content.

Referring to FIG. 4, a second particular illustrative embodiment of a method of restricting access to video content is illustrated. At block 400, a set-top box device receives a request for video content from a remote user device via a video distribution network. Moving to decision node 402, in an illustrative embodiment, the set-top box device can determine whether a blackout enforcement application or other similar application is installed at the remote user device. If the set-top box device determines that such an application is installed at the remote user device, the method can advance to block 406. Conversely, in an illustrative embodiment, if the set-top box device determines that such an application is not installed at the remote user device, the method can proceed to block 404, and the set-top box device instruct an application server of the IPTV system or other video head-end to install the application at the remote user device. Alternatively, the set-top box device can receive the application and install it at the remote user device. The method then continues to block 406.

At block 406, in a particular embodiment, the set-top box device can receive the requested video content. For example, the set-top box device can request and receive marked data packets of the video content from a server of the IPTV system or other video head-end. Moving to decision node 408, the set-top box device can determine whether the video content is subject to a blackout or other restriction. In an illustrative embodiment, the video content can include data indicating whether the video content is subject to a blackout or other restriction. If the set-top box device determines that the video content is not subject to a blackout or other restriction, the method proceeds to block 430, and the set-top box device re-directs the video content to the remote user device. In an illustrative embodiment, the set-top box device can send the video content to the remote user device or can instruct a video server or other server of the IPTV system or other video head-end to send the video content to the remote user device.

In a particular embodiment, if the set-top box device determines that the video content is subject to a blackout or other restriction, the method advances to block 410, and the set-top box device receives location data indicating a location of the remote user device from the IPTV system or other video head-end. Continuing to decision node 412, the set-top box device determines whether the remote user device is located within a market zone or other location or region where the set-top box device is located. If the set-top box device determines that the remote user device is located within the market zone of the set-top box device, for example, the method proceeds to decision node 414, and the set-top box device determines based on the data received with the video content whether the video content is restricted within the market zone of the set-top box device.

If the set-top box device determines that the video content is not restricted within the market zone of the set-top box device, the method proceeds to block 418, and the set-top box device can re-direct the video content to the remote user device. Whereas, in a particular embodiment, if the set-top box device determines that the video content is restricted within the market zone of the set-top box device, the method can move to decision node 416, and the set-top box device can determine whether the user purchases the video content. For example, the set-top box device can determine based on data received with the video content that the video content can be purchased and can send a payment interface to the remote user device. If payment information is received via the payment interface, the method can proceed to block 418, and the set-top box device can re-direct the video content to the remote user device. Conversely, if payment information is not received, the method proceeds to block 432, and the set-top box device enforces the blackout or other restriction, for instance, by not sending the video content to the remote user device; by instructing a server of the IPTV system or other video head-end to not send the video content to the remote user device; by instructing a blackout enforcement application at the remote user device not to send the video content to a display; or any combination thereof.

Returning to decision node 412, if the set-top box device determines that the remote user device is not located within the market zone or other location of the set-top box device, the method can proceed to decision node 420, and the set-top box device can determine whether the video content is subject to a blackout or other restriction at a location, or within a region that includes the location, of the remote user device. If the video content is not restricted at a location, or within a region that includes the location, of the remote user device, the method proceeds to block 430, and the set-top box device re-directs the video content to the remote user device.

Conversely, in an illustrative embodiment, if the video content is restricted at a location, or within a region that includes the location, of the remote user device, the method can move to decision node 422, and the set-top box device can determine whether the video content is restricted at a location, or within a region that includes the location, of the set-top box device. If the set-top box device determines that the video content is restricted at a location, or within a region that includes the location, of the set-top box device, the method advances to decision node 426. On the other hand, if the set-top box device determines that the video content is not restricted or will not be restricted in the future at a location, or within a region that includes the location, of the set-top box device, the method can continue to block 424, and the set-top box device can record the video content.

Moving to decision node 426, in a particular embodiment, the set-top box device can determine whether the remote user device is communicating with the IPTV system or other video head-end via a private network of a video service provider. If the set-top box device determines that the remote user device is not communicating via the private network, the method proceeds to block 432, and the set-top box device can enforce the blackout or other restriction. On the other hand, if the remote user device is communicating via the private network, the method moves to decision node 428, and the set-top box device determines whether it receives payment information from the remote user device. If the set-top box receives payment information, the method continues to block 430, and the set-top box re-directs the requested video content to the remote user device. If the set-top box does not receive payment information, the method proceeds to block 432, and the set-top box device enforces the blackout or other restriction. The method then terminates at 434.

Figure 5:
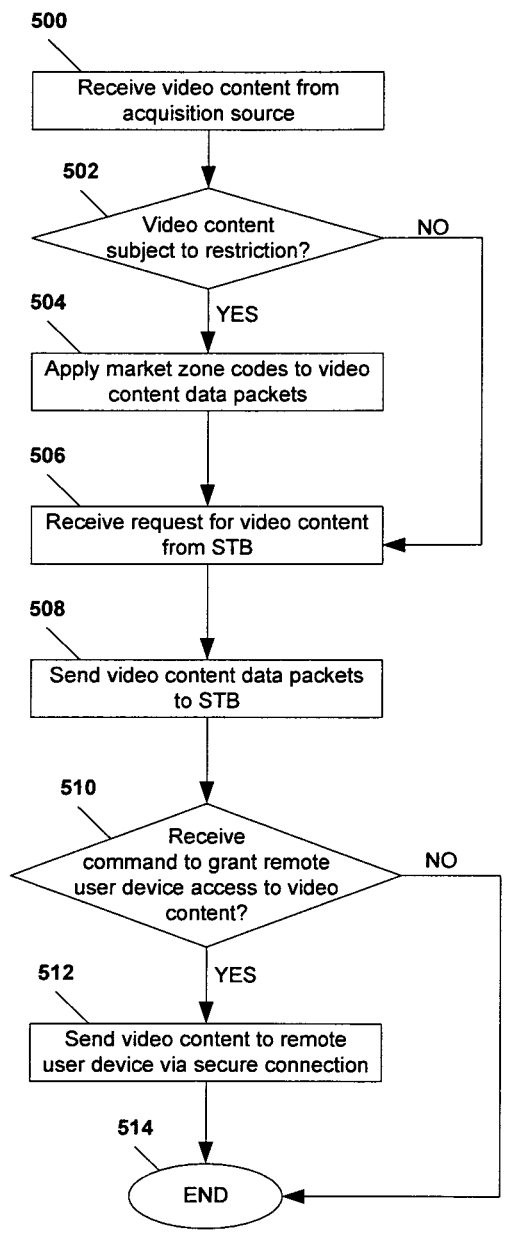
FIG. 5 is a flow diagram of a third particular illustrative embodiment of a method of restricting access to video content.

Referring to FIG. 5, a third particular illustrative embodiment of a method of restricting access to video content is illustrated. At block 500, a video server or other server of an Internet Protocol Television (IPTV) system or other video head-end receives video content from an acquisition source. Moving to decision node 502, the server can determine whether the video content is subject to a blackout or other restriction. For example, information sent with the video content can indicate whether the video content is subject to such a restriction. Alternatively, the server or another server of the IPTV system or other video head-end can store data associating certain video content with blackouts or other restrictions. If the server determines that the video content is not subject to a restriction, the method can advance to block 506. Whereas, in an illustrative embodiment, if the server determines that the video content is subject to a restriction, the method can proceed to block 504, and the server can add data to the video content that includes codes or other information indicating market zones or other regions or locations within which the video content is subject to the restriction. The method continues to block 506.

At block 506, the server receives a request for video content from a set-top box device. Moving to block 508, the server sends the requested video content to the set-top box device. Continuing to decision node 510, in a particular embodiment, the server determines whether it has received a command or instruction to send the video content to a remote user device communicating with the set-top box device. In an illustrative embodiment, if the server receives such an instruction, the method proceeds to block 512, and the server sends the video content to the remote user device via a secure connection. The method terminates at 514.

In a particular embodiment, the steps of the methods described herein can be executed in the order shown by the figures. In alternative embodiments, some steps can be executed simultaneously or in alternative sequences.

In conjunction with the configuration of structure described herein, the system and method disclosed restrict access to video content that is subject to a blackout or other restriction within one or more market zones or other regions or locations. In a particular illustrative embodiment, a user computing device can send a request to a set-top box device to receive video content. In an illustrative embodiment, the set-top box device can communicate with the user computing device via a video distribution network of an Internet Protocol Television (IPTV) system or other video head-end.

The set-top box device can request the video content from a video server or other server of the IPTV system or other video head-end. In a particular embodiment, the set-top box device can receive one or more marked data packets related to the video content that include data, header information, or any combination thereof, indicating whether the video content is subject to a blackout or other restriction, one or more market zones within which the video content is subject to a blackout or other restriction, or any combination thereof.

In an illustrative embodiment, the set-top box device can re-direct the marked data packet(s) to the user computing device via a re-director portion of the set-top box device. A blackout enforcement application or other application stored at the user computing device can be adapted to determine whether the requested video content is subject to a blackout or other restriction based on blackout data included in the marked data packet(s). In addition, the application can be adapted to determine one or more market zones or other regions or locations in which the requested video content is restricted. If the video content is subject to a blackout or other restriction, the application can be adapted to communicate with a location server of the IPTV system or other video head-end to receive location data indicating a market zone or other location of the user computing device and to cause the user computing device to not display the video content when the video content is subject to a blackout or other restriction at a location, or within a region that includes the location, of the user computing device.

In another illustrative embodiment, the set-top box device, re-director, or any combination thereof, can determine whether the requested video content is subject to a blackout or other restriction based on the marked data packets. In addition, the set-top box device, re-director, or any combination thereof, can determine one or more market zones or other regions or locations in which the video content is subject to the restriction. Further, the set-top box device, re-director, or any combination thereof, can receive location data from the location server, or another server of the IPTV system or other video head-end, that indicates a location of the user computing device.

The set-top box device, re-director, or any combination thereof, can determine based at least partially on the marked data packets, the location data, or any combination thereof, whether the video content is subject to a restriction at a location, or within a region that includes the location, of the user computing device. If the video content is not subject to a restriction at a location, or within a region that includes the location, of the user computing device, the set-top box device, re-director, or any combination thereof, can re-direct the requested video content to the user computing device by sending the video content to the user computing device or instructing a video server or other server of the IPTV system or other video head-end to send the video content to the user computing device. If the video content is subject to a restriction at a location, or within a region that includes the location, of the user computing device, the set-top box device, re-director, or any combination thereof, can not re-direct the requested video content to the user computing device. In an exemplary embodiment, the set-top box device, re-director, or any combination thereof, can send data to the user computing device indicating that the video content cannot be accessed or is unavailable.

Figure 6:
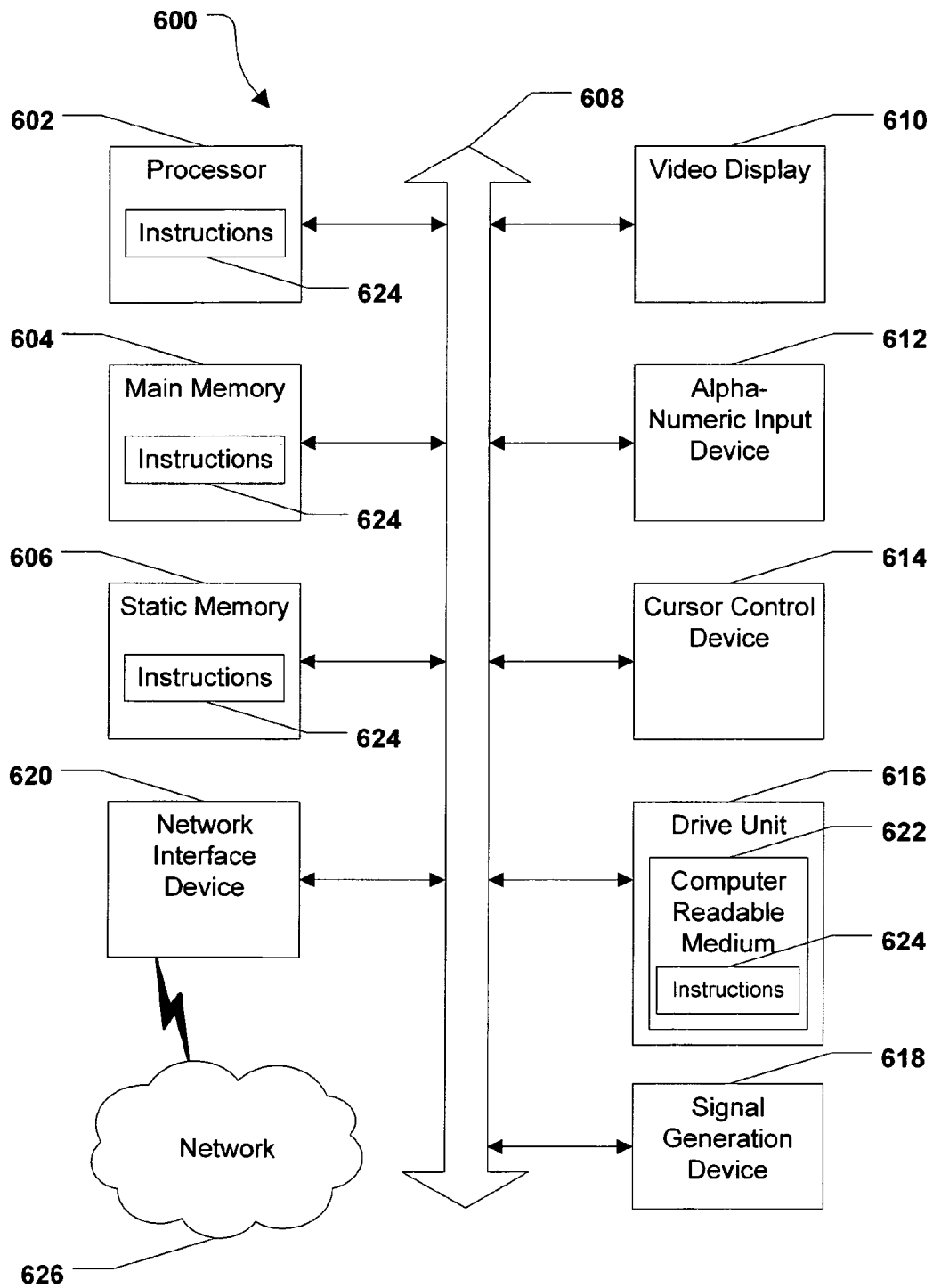
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including a server or other system, a set-top box device, a remote user computing device, or other communications device, or any combination thereof, as shown in FIGS. 1-2.

In a networked deployment, the computer system may operate in the capacity of an IPTV server, such as location server, application server, or video server, or a set-top box device, remote user computing device, or other communications device. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of restricting access to video content, the method comprising:
    sending a request for video content to a set-top box device from a remote user device via a video distribution network, the request causing recording of the video content in response to the video content being unrestricted at a location of the set-top box device while the video content is restricted at a location of the remote user device when the request is sent;
    analyzing, at the remote user device, data of video content received at the remote user device in response to the request to determine whether the video content is subject to a location restriction;
    receiving location data at the remote user device when the video content is subject to the location restriction, the location data indicating a location estimate of the remote user device; and
    sending a restriction notice to a display device of the remote user device when analysis of the location estimate indicates that the remote user device is within a region where the video content is location restricted.

2. The method of claim 1, wherein analyzing data of the video content comprises determining whether access to the video content is location restricted based on at least one marked data packet of the video content.

3. The method of claim 2, wherein the at least one marked data packet includes a leading data packet related to the video content.

4. The method of claim 2, wherein the at least one marked data packet includes marking data indicating that the video content is subject to a blackout condition, that the video content is not subject to a blackout condition, that the video content is subject to a blackout condition within at least one market zone, that the video content is not subject to a blackout condition within at least one market zone, or any combination thereof.

5. The method of claim 1, wherein the video content is sent to the remote user device after the set-top box determines that the remote user device includes an installed blackout enforcement application.

6. The method of claim 1, further comprising displaying the video content at the display device of the remote user device when access to the video content is not restricted.

7. The method of claim 1, wherein the video distribution network is an access network of an internet protocol television system.

8. The method of claim 7, wherein the video content is received from a video server of the internet protocol television system.

9. The method of claim 7, wherein the video content is received from the set-top box device.

10. The method of claim 1, further comprising:
    determining at the remote user device whether access to the video content is available in exchange for a payment; and
    sending a payment interface to the display device when the video content is available in exchange for the payment.

11. The method of claim 10, further comprising:
    sending payment information to a billing server; and
    displaying the video content at the remote user device after the payment information is received at the billing server.

12. The method of claim 1, further comprising, in response to a determination that the remote user device does not have a blackout enforcement application installed, receiving and installing the blackout enforcement application at the remote user device, wherein the blackout enforcement application is downloaded and installed at the remote user device in response to an instruction from the set-top box device to download the blackout enforcement application from a server.

13. The method of claim 1, further comprising, in response to a determination that the remote user device does not have a blackout enforcement application installed, receiving and installing the blackout enforcement application at the remote user device, wherein the set-top box device sends a message to a server and wherein a blackout enforcement application is received at the remote user device from the server in response to the message.

14. The method of claim 1, further comprising, in response to a determination that the remote user device does not have a blackout enforcement application installed, receiving and installing the blackout enforcement application at the remote user device, wherein a blackout enforcement application is received at the remote user device from the set-top box device.

15. A method of restricting access to video content, the method comprising:
    receiving a request for video content at a set-top box device from a remote user device via a private access network of an internet protocol television system;
    receiving location data at the set-top box device via the private access network, the location data indicating a location of the remote user device;
    determining at the set-top box device whether access to the video content is restricted at the location of the remote user device when the request is received; and
    initiating recording of the video content using the set-top box device when the video content is unrestricted at the location of the set-top box device while the video content is restricted at the location of the remote user device when the request is received.

16. The method of claim 15, further comprising sending blackout data to the remote user device, the blackout data indicating that the video content is inaccessible at the location of the remote user device when the video content is restricted at the location of the remote user device.

17. The method of claim 15, further comprising re-directing the video content to the remote user device via the private access network when access to the video content is not restricted, wherein re-directing the video content includes instructing a video server of the internet protocol television system to send the video content to the remote user device.

18. The method of claim 15, further comprising:
receiving the video content via the private access network at the set-top box device.

19. The method of claim 18, wherein the video content is sent to a digital video recorder of the set-top box device when the recording of the video content is initiated.

20. The method of claim 18, further comprising re-directing the video content to the remote user device via the private access network when access to the video content is not restricted at the location of the remote user device, wherein re-directing the video content includes sending the video content from the set-top box device to the remote user device via the internet protocol television system.

21. The method of claim 15, further comprising:
determining whether access to the video content can be obtained after payment information is sent to the internet protocol television system;
sending a payment interface to the remote user device;
sending payment information received from the remote user device via the payment interface to a billing server of the internet protocol television system; and
wherein the billing server instructs a video server of the internet protocol television system to send the video content to the remote user device.

22. A set-top box device, comprising:
a processor;
a memory device accessible to the processor, wherein the memory device includes instructions executable by the processor to:
receive a request for video content from a remote user device via a private access network of an internet protocol television system,
determine whether access to the video content is subject to a location restriction;
receive an estimated location of the remote user device when access to the video content is subject to the location restriction,
determine whether access to the video content is restricted for the remote user device when the request is received based on the estimated location; and
initiate recording of the video content when the video content is unrestricted at a location of the set-top box device while the video content is restricted for the remote user device when the request is received; and
a re-director to re-direct the requested video content to the remote user device via the private access network when access to the video content is not restricted for the remote user device.

23. The set-top box device of claim 22, wherein the memory device further includes instructions executable by the processor to:
send a command to an application server of the internet protocol television system to send offer data to the remote user device when access to the video content is restricted for the remote user device, the offer data related to an offer to purchase the video content for viewing.

24. The set-top box device of claim 22, wherein the location restriction comprises a limitation that inhibits the video content from being viewed in one or more market zones.

25. The set-top box device of claim 22, wherein the re-director comprises a device coupled to or integrated with the set-top box device or instructions stored within the memory device.

26. A tangible computer-readable storage device storing instructions executable by a processor to:
send a request for video content to a set-top box from a remote user device, the request causing recording of the video content in response to the video content being unrestricted at a location of the set-top box while the video content is restricted at a location of the remote user device when the request is sent;
receive the video content;
analyze data of the video content received in response to the request to determine whether the video content is subject to a location restriction;
receive a location estimate for the processor when the video content is subject to the location restriction; and
send a restriction notice to a display device when analysis of the location estimate indicates that the processor is within a region where the video content is location restricted.

27. The tangible computer-readable storage device of claim 26, wherein the data includes at least one marked data packet that indicates that the video content is subject to a blackout condition, that the video content is not subject to a blackout condition, that the video content is subject to a blackout condition within at least one market zone, that the video content is not subject to a blackout condition within at least one market zone, or any combination thereof.

* * * * *